US005134330A

United States Patent [19]

Haas et al.

[11] Patent Number: 5,134,330

[45] Date of Patent: Jul. 28, 1992

[54] APPARATUS TO REPLACE CRIMP-MOUNTED SOLENOIDS ON STARTER MOTORS

[76] Inventors: Milton Haas, 160 S. Martel Ave., Los Angeles, Calif. 90036-2714; Joe C. Y. Hsieh, 91 E. Gainsborough Rd., Thousand Oaks, Calif. 91360-3553

[21] Appl. No.: 782,537

[22] Filed: Oct. 25, 1991

Related U.S. Application Data

[62] Division of Ser. No. 654,252, Feb. 12, 1991, Pat. No. 5,090,109.

[51] Int. Cl.⁵ .......... H02K 15/00

[52] U.S. Cl. .......... 310/83; 310/89; 29/596

[58] Field of Search .......... 29/596, 426.4; 310/42, 310/83, 89, 91

[56] References Cited

U.S. PATENT DOCUMENTS

| | | | |
|---|---|---|---|
| 4,644,204 | 2/1987 | Lakin | 310/89 |
| 4,837,468 | 6/1989 | Froment | 310/89 |
| 4,931,682 | 6/1990 | Borcherding et al. | 310/89 |
| 5,090,109 | 2/1992 | Haas et al. | 29/596 |

*Primary Examiner*—Steven L. Stephan
*Assistant Examiner*—D. Rebsch
*Attorney, Agent, or Firm*—Kelly Bauersfeld & Lowry

[57] ABSTRACT

Apparatus to replace a starter solenoid unit of a starter motor assembly, in which the original solenoid unit is mounted into an open-ended lever housing cap by crimps includes drilling into the crimps to form substantially circular holes in the lever housing cap proximate the open end, which align with outwardly open threaded ports in the replacement starter solenoid. Screws are then inserted through the lever housing cap and fastened into the threaded ports of the replacement solenoid. Clamp washers may also be used.

3 Claims, 2 Drawing Sheets

FIG. 1
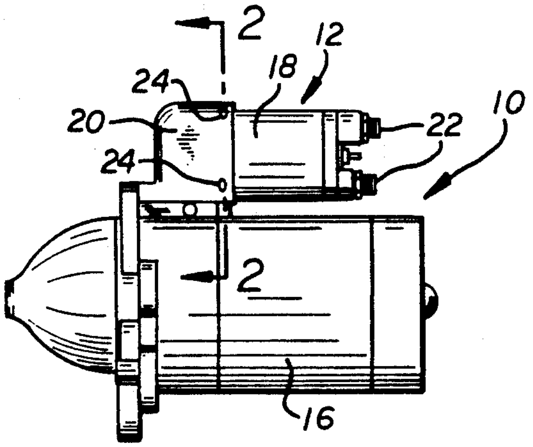
FIG. 3
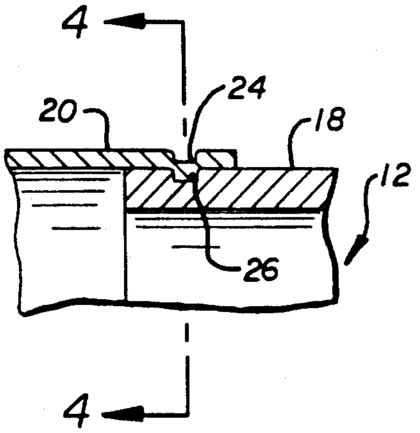
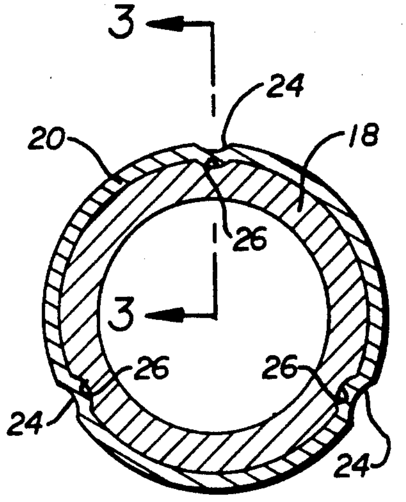
FIG. 2
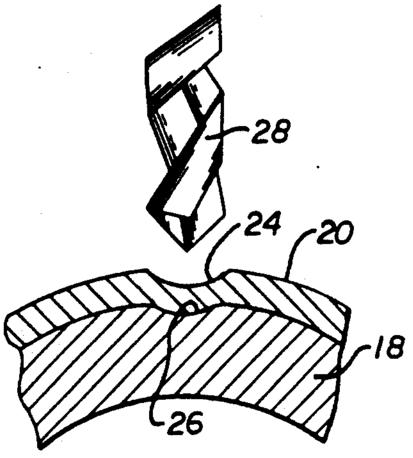
FIG. 4A
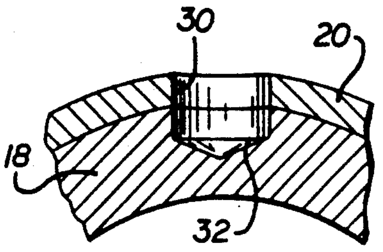
FIG. 4B FIG. 6
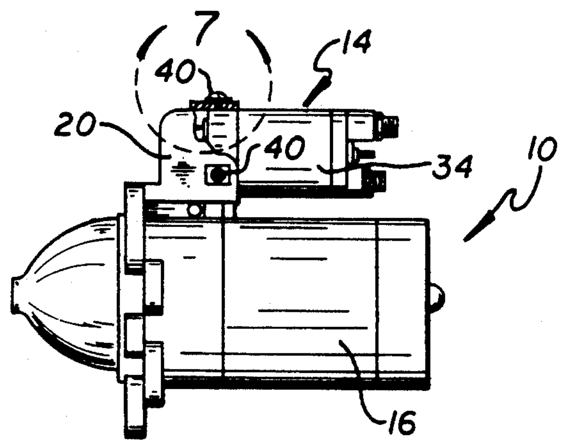
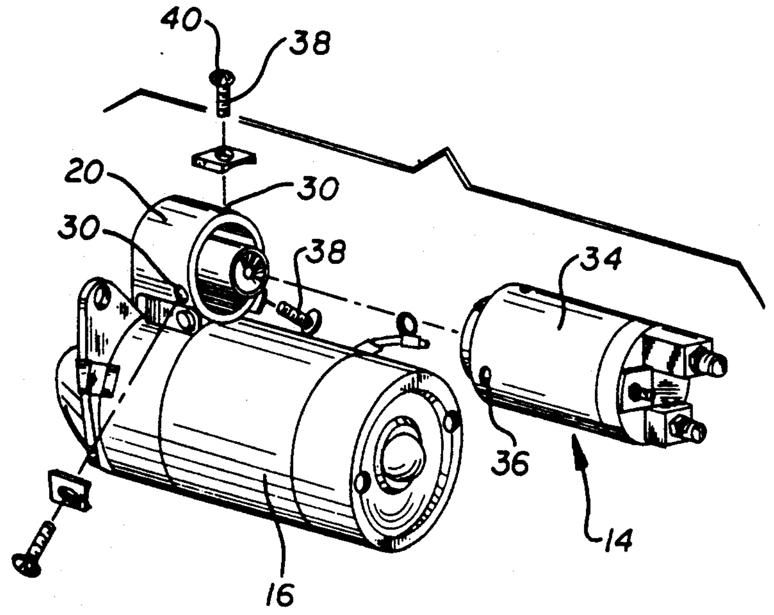
FIG 5
FIG. 8
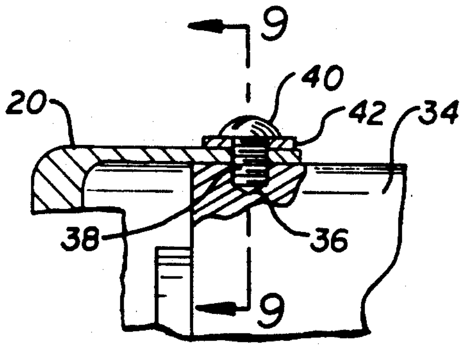
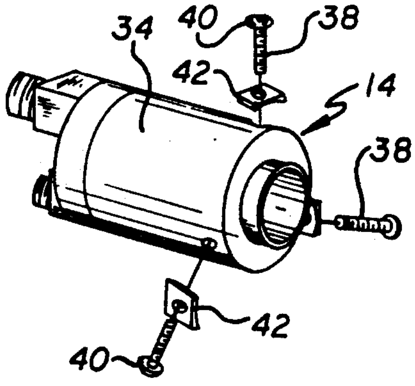
FIG. 7
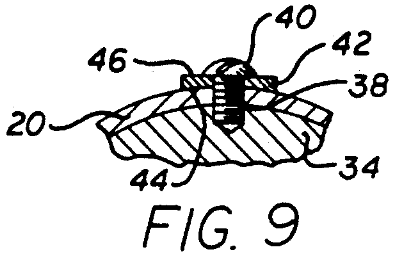
FIG. 9

APPARATUS TO REPLACE CRIMP-MOUNTED SOLENOIDS ON STARTER MOTORS

This is a divisional of copending application Ser. No. 07/654,252, filed on Feb. 12, 1991, now U.S. Pat. No. 5,090,109.

FIELD OF THE INVENTION

The present invention relates generally to a method and apparatus for use in rebuilding an automobile starter system. More specifically, this invention relates to an improved method and apparatus to replace a solenoid unit of a starter motor assembly.

BACKGROUND OF THE INVENTION

The starting system in an automobile converts electrical energy from the battery into mechanical energy at a starter motor to crank an engine. More specifically, the starting system contains a starter motor with a starter gear, and a starter solenoid unit. When the key is turned to "start", the starter solenoid unit connects the starter motor to the battery causing it to turn and at the same time the starter solenoid unit engages the starter gear to the engine crankshaft flywheel gear. Crankshaft rotation causes the pistons to move up and down and also operates the intake and exhaust valves for the cylinders. As soon as one or a few cylinders fire, the engine starts to run on its own and the driver releases the key from "start" to "on". The solenoid unit disconnects the starter motor from the battery and retracts the starter gear from the engine crankshaft flywheel gear.

The starter solenoid unit and starter motor are normally provided as an integrated assembly. In many cases, the solenoid unit is mounted within one end of an open-ended cylindrical cap on one side of a starter motor housing. An internal lever within the cap interconnects the starter solenoid unit with the starter motor. Therefore, the solenoid mounting cap is often referred to as a lever housing cap.

In many starter motor assemblies, one end of the solenoid unit is secured within the open-ended lever housing cap by the use of a plurality of radial indented crimps on the inside of the lever housing which engage the sides of the solenoid. For example, starter solenoids in most Delco-Remy starter motor assemblies of the type used in General Motors automobiles are secured in this manner. This crimp mounting technique essentially fixes the solenoid unit permanently into the open-ended lever housing cap.

Accordingly, in the event of failure of the solenoid unit, an automobile owner having a starter motor assembly with the solenoid unit attached in this manner finds himself in the unenviable position of having to replace the entire starter motor assembly.

The present invention overcomes this problem by providing a method and related apparatus to replace a defective solenoid unit in a starter motor assembly of a type commonly found in Delco-Remy starter motors. More specifically, the present invention provides a method and apparatus for mounting a replacement solenoid unit into the lever housing cap of a starter motor assembly wherein an original crimp-mounted solenoid unit has been removed.

SUMMARY OF THE INVENTION

The present invention resides in an improved method and apparatus for replacing a defective solenoid unit in a starter motor assembly of the type that has heretofore prevented this replacement. The method allows for removing and replacing a starter solenoid unit of the type mounted into an open-ended lever housing cap by a plurality of indented crimps. The method and apparatus comprise, generally, drilling through said crimps to form a plurality of radial substantially circular holes in the lever housing cap proximate the open end and sufficient to permit removal of the solenoid unit from the open-ended lever housing cap by pulling it apart therefrom. A replacement solenoid unit is then inserted into said open-ended lever housing cap, with the replacement solenoid unit having at one end thereof a plurality of radial outwardly open threaded ports to align with the drilled holes in the layer housing cap. A plurality of screws are then inserted through the lever housing cap and fastened into the threshold ports of the replacement solenoid unit to securely mount the solenoid unit in place.

In a preferred form, a plurality of clamp washers are seated against the exterior of the lever housing cap and clamped tightly between the lever housing cap and the head of the associated screw. Each of the clamp washers has an inner and an outer surface, with the inner surface of each clamp washer being contoured to mate with the cylindrical shape of the exterior surface of the lever housing cap. By contrast, the outer surface of each clamp washer is generally flat to maximize contact between the clamp washer and the underside of the associated screw head.

Other features and advantages of the present invention will become apparent from the following more detailed description, taken in conjunction with the accompanying drawing which illustrate, by way of example, the principles of the invention.

BRIEF DESCRIPTION OF THE DRAWINGS

The accompanying drawings illustrate the invention. In such drawings:

FIG. 1 is a side elevational view of a starter motor assembly having a solenoid unit mounted into an open-ended lever housing cap by a plurality of indented crimps;

FIG. 2 is an enlarged transverse sectional view taken generally on the line 2—2 of FIG. 1;

FIG. 3 is a fragmented vertical sectional view taken generally on the line 3—3 of FIG. 2;

FIG. 4A is a fragmented transverse sectional view taken generally on the line 4—4 of FIG. 3 and showing a drill for use in the method of the invention;

FIG. 4B is a fragmented transverse sectional view similar to that shown in FIG. 4A showing aligned openings in the lever housing cap and the solenoid unit as a result of the drilling step of FIG. 4A;

FIG. 5 is an exploded perspective view illustrating installation of a replacement solenoid unit into the lever housing cap;

FIG. 6 is a side elevational view of a starter motor assembly having the replacement solenoid unit mounted therewith;

FIG. 7 is an enlarged and fragmented side elevational view of a portion of the starter motor assembly corresponding generally with the encircled region 7 of FIG. 6;

FIG. 8 is an exploded perspective view of a replacement solenoid unit for use in the invention; and FIG. 9 is a fragmented vertical sectional view taken generally on the line 9—9 of FIG. 7.

DETAILED DESCRIPTION OF THE PREFERRED EMBODIMENT

As shown in the exemplary drawings, the present invention relates to a method and apparatus for replacing the original solenoid unit of a starter motor assembly referred to generally in FIG. 1 by the reference numeral 10. The starter motor assembly 10 is provided in association with an internal combustion engine (not shown) of the type used in automobiles and the like. When the original solenoid unit 12 becomes defective for any reason, the invention provides for relatively rapid removal and replacement with a replacement solenoid unit 14, as viewed in FIGS. 5–9.

More particularly, and as is known in the art, the starter motor assembly 10 shown in FIG. 1 comprises a starter motor housing 16 encasing a starter motor (not shown) adapted to engage and temporarily drive an internal combustion engine during an engine start procedure. In this regard, in the context of a typical automotive vehicle, the starter motor normally includes a small gear to rotate an engine and thereby drive the engine during a start procedure. The starter gear is temporarily displaced into coupled relation with the engine crankshaft flywheel gear by the solenoid unit 12 forming a portion of the starter motor assembly 10, and typically mounted onto the starter motor housing 16 at one side thereof. More specifically, as shown in FIG. 1, the solenoid unit normally comprises a cylindrical solenoid housing 18 encasing solenoid components (not shown), with one end of the solenoid housing 18 being mounted within an open-ended cylindrical cap 20 at one side of the starter motor housing 16. The opposite and exposed end of the solenoid housing 18 includes an end piece with appropriate terminals 22 for suitable connection to a vehicle battery or the like. As is known in the art, the cap 20 encases a lever mechanism (also not shown) for interconnecting the solenoid unit with the starter gear, whereby the cap 20 is normally referred to as a lever housing cap.

The starter motor assembly 10 of FIG. 1 comprises one particularly well known geometry for a starter motor assembly wherein the original equipment solenoid unit 12 is secured in an essentially permanent manner into the lever housing cap 20 by means of a plurality of radially indented crimps 24. More specifically, as viewed in FIGS. 2 and 3, the crimps 24 (three of which are shown) are formed mechanically at circumferentially spaced positions about the lever housing cap 20 to seat within aligned recesses formed in the end of the solenoid housing 18. In this way, removal of the original solenoid unit 12 has been effectively prevented since the indented crimps are difficult or impossible to withdraw from the solenoid housing recesses 26. Accordingly, in the event that the original solenoid unit 12 becomes defective for any reason, it has been necessary to replace the entire starter motor assembly. Starter motor assemblies of this type are commonly available under the Delco-Remy trademark and are normally used as original equipment on automobiles manufactured by General Motors Corporation.

The method and apparatus of the present invention provides a relatively simple approach to removing a defective solenoid unit 12 from the starter motor assembly 10, and replacing the defective unit with a replacement solenoid unit 14. With reference to FIGS. 4A and 4B, the method involves drilling through the indented crimps 24 with a drill bit 28 of appropriate size to remove the crimp. This drilling step creates a radially outwardly open hole 30 (FIG. 4B) at the location of each crimp 24. Additionally, this drilling step will normally create a small hole or recess 32 in the housing 18 of the original solenoid unit 12 to effectively destroy the solenoid unit which is, of course, defective. Importantly, the solenoid unit 12 is thus released from the lever housing cap 20 and may be withdrawn normally therefrom for disposal.

With the original solenoid unit 12 removed, the replacement solenoid unit 14 can be installed quickly and easily into the lever cap housing 20, as shown in FIGS. 5–9. A cylindrical solenoid housing 34 for the replacement solenoid unit 14 has a plurality of radially outwardly open threaded ports 36 formed therein near one end thereof. The position of these threaded ports 36 correspond with the positions of the recesses 26 of the original solenoid unit (FIG. 2) and thus align with the hole 30 drilled in the lever housing cap 20 wherein the end of the replacement solenoid unit 14 is slidably fitted into the cap 20. A plurality of threaded fasteners such as screws 38 having heads 40 can then be fastened quickly and easily through the cap holes 30 and into the threaded ports 36 to securely mount the replacement solenoid unit 14.

In the preferred form of the invention, the fasteners 38 are each associated with a clamp washer 42 designed to insure secure mounting of the replacement solenoid unit 14. In particular, each clamp washer 42 has a curved, generally part-cylindrical lower surface 44 (FIG. 9) shaped to seat matingly upon the exterior of the lever housing cap 20, and a substantially flat upper surface 46 shaped to seat matingly with the flat underside of the associated screw head 40. This shaping of the clamp washers 42 assures intimate surface contact with the screw heads 40 and the lever housing cap 20 to prevent the replacement solenoid unit 14 from working loose, for example, in response to engine vibration over a period of time.

From the foregoing it is to be appreciated that the improved method and related apparatus to replace a solenoid unit in a starter motor assembly of the present invention is easy to practice and use and provides the additional advantages of making car repairs less costly and more expedient.

Although a particular embodiment of the invention has been described in detail for purpose of illustration, various modifications may be made without departing from the spirit and scope of the invention. Accordingly, the invention is not to be limited except as by the appended claims.

We claim:

1. In a starter motor assembly having a solenoid unit mounted within an open-ended and generally cylindrical lever housing cap by a plurality of radially indented crimps formed in said lever housing cap, and wherein said solenoid unit has been removed by drilling through said crimps to form radial holes in the cap and to release the solenoid unit from said cap, a replacement solenoid assembly, comprising:

a solenoid unit having a generally cylindrical housing adapted for slide-fit reception into said lever housing cap and having a plurality of radially outwardly open threaded ports for alignment with the radial holes in the cap; and a plurality of screws passed through the holes in the cap and fastened into said threaded ports in said solenoid unit housing.

2. The replacement solenoid assembly of claim 1 wherein each of said screws has a head with a substantially underside surface, and further including a plurality of clamp washers associated, respectively with and having said screws passed therethrough, each of said clamp washers having an underside surface of curved shape for substantially mating contact with said lever housing cap, and a substantially flat upper surface for mating contact with the head of the associated screw.

3. An apparatus for mounting a replacement starter solenoid unit having a plurality of radially outwardly open threaded ports into an open-ended cylindrical lever housing cap having a plurality of radially open holes formed therein, said radial ports aligning with said radial holes when said replacement solenoid unit is inserted into said lever housing cap, the apparatus comprising:

a plurality of clamp washers, said clamp washers having a lower surface of curved shape for substantially mating contact with said lever housing cap and a substantially flat upper surface; and a plurality of screws each having a head with a substantially flat underside surface, said screws being respectively inserted through each aligned pair of clamp washers and cap holes and fastened into the threaded port associated therewith, with said flat surface matingly seated upon said upper surface of the associated clamp washer.

* * * * *

UNITED STATES PATENT AND TRADEMARK OFFICE
CERTIFICATE OF CORRECTION

PATENT NO. : 5,134,330

DATED : July 28, 1992

INVENTOR(S) : Milton Haas and Joe C.Y. Hsieh

It is certified that error appears in the above-identified patent and that said Letters Patent is hereby corrected as shown below:

Column 2, line 15, "layer" should read --lever--; line 17, "threshold" should read --threaded--.

Column 3, line 22, insert --starter gear for engaging an engine crankshaft flywheel-- after "small".

Signed and Sealed this

Fifth Day of October, 1993

Attest:

Bruce Lehman

BRUCE LEHMAN

Attesting Officer

*Commissioner of Patents and Trademarks*